Dec. 2, 1924.                                                            1,517,791
R. G. McANDREW
GROUND SEEDING APPARATUS
Filed March 25, 1922          2 Sheets-Sheet 1
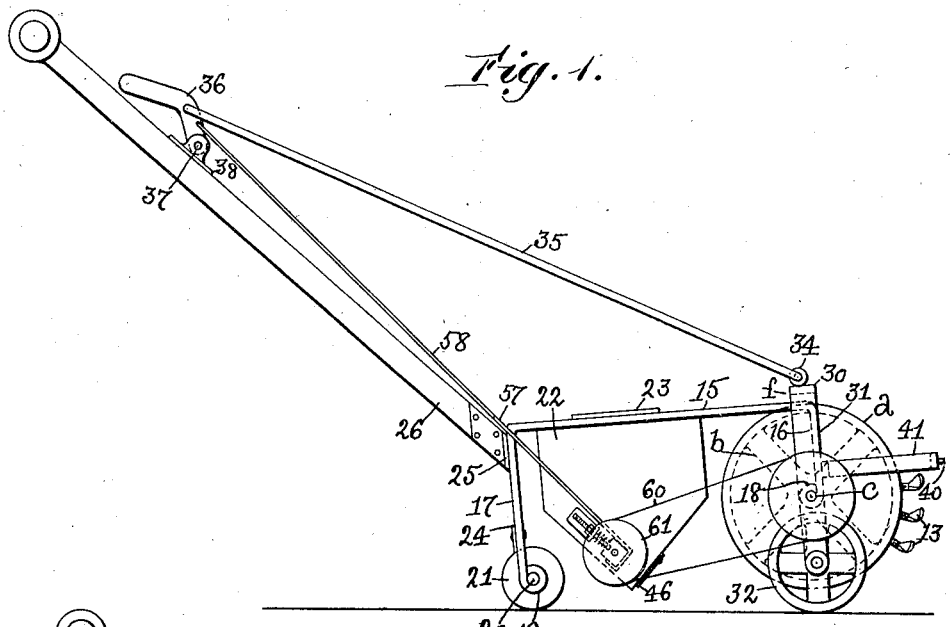
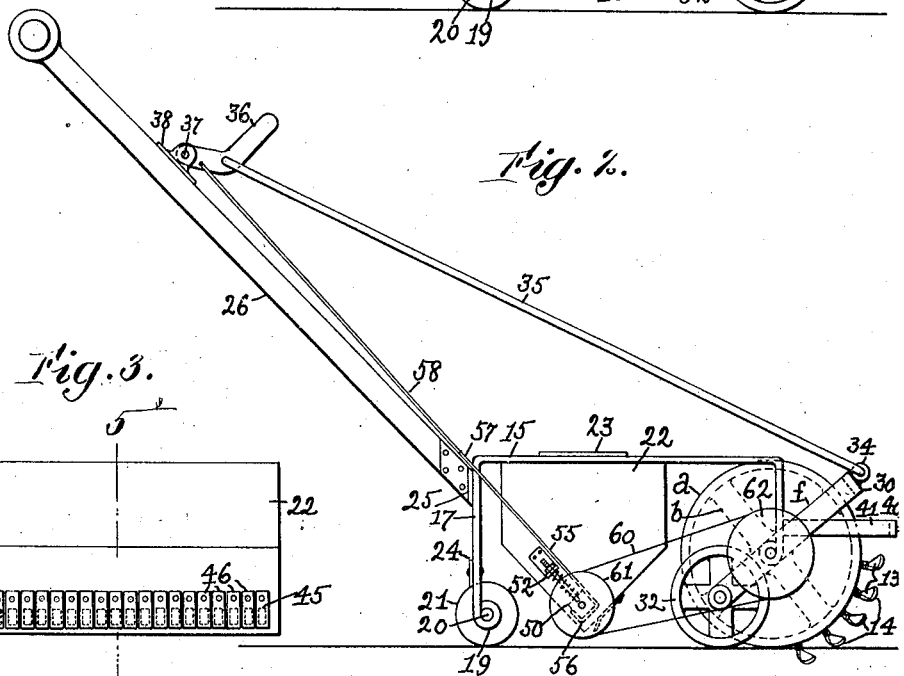
Inventor:
Robert G. McAndrew
by Jas. H. Churchill
Att'y.

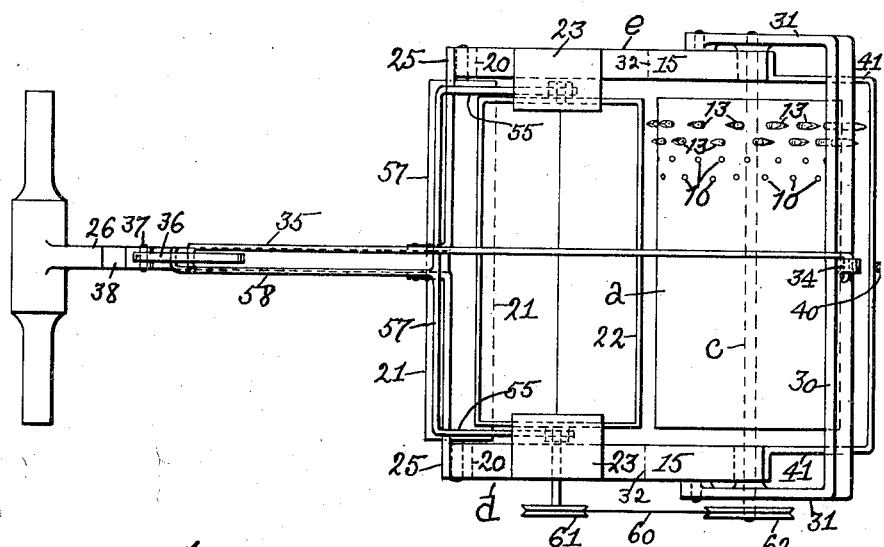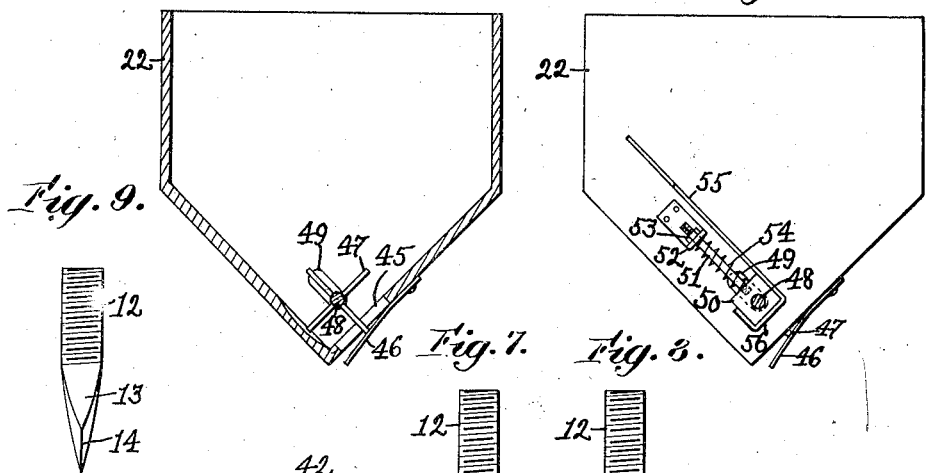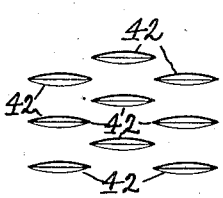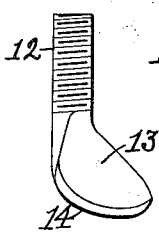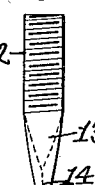

Patented Dec. 2, 1924.

1,517,791

UNITED STATES PATENT OFFICE.

ROBERT G. McANDREW, OF BOSTON, MASSACHUSETTS.

GROUND-SEEDING APPARATUS.

Application filed March 25, 1922. Serial No. 546,747.

*To all whom it may concern:*

Be it known that I, ROBERT G. McANDREW, a citizen of the United States, residing in Boston, in the county of Suffolk and State of Massachusetts, have invented an Improvement in Ground-Seeding Apparatus, of which the following description in connection with the accompanying drawings, is a specification, like characters on the drawings representing like parts.

This invention relates to apparatus for seeding ground, and has for its object to provide a simple, inexpensive and highly efficient apparatus, which is especially adapted for use on the putting greens of golf links.

To this end, the apparatus is provided with a roller having projecting from its circumference a plurality of knives or cutters, preferably arranged in circumferential rows, with the knives or cutters in one row in staggered relation to those in an adjacent row.

The cutters or knives are constructed as will be described to cut into the ground and open up the cut for the reception of the seed, which may be spread over the cut ground by hand or as is preferred, from a seed-containing box mounted upon the framework which carries the knife roller.

The seed box may and preferably will be provided with outlet ports which are arranged in line with the circumferential rows of knives, and said ports have cooperating with them valves which control the flow of seed out of the seed box. The valves may be opened by mechanical means located within the feed box, and provision may and preferably will be made for moving the valve opening mechanism into operative and inoperative relation to the valves at the will of the operator.

The framework carrying the knife roller may and preferably will be provided with means for raising the knife roller off of the ground, to avoid dulling the knives, when the apparatus is moved from one putting green to another.

These and other features of this invention will be pointed out in the claims at the end of this specification.

Fig. 1 is a side elevation of an apparatus embodying this invention with the knife roller in its inoperative position.

Fig. 2, a like view with the knife roller in its operative position.

Fig. 3, a side elevation of the seed box.

Fig. 4, a plan of the apparatus shown in Fig. 1.

Fig. 5, a section through the seed box taken on the line 5—5, Fig. 3.

Fig. 6, an elevation of one end of the seed box.

Figs. 7, 8 and 9, details of the knives or cutters shown in Fig. 1, and

Fig. 10, a diagrammatic view to illustrate the manner in which ground is opened up by the knives.

Referring to the drawings $a$ represents a roller preferably made as a hollow metal cylinder or drum, having spiders $b$ at its opposite ends to support a shaft $c$ upon which the roller is mounted to turn therewith. The hollow drum or cylinder $a$ is provided on its periphery with a plurality of circumferential rows of threaded sockets 10, for the reception of the threaded shanks 12 of knives or cutters 13. The threaded sockets 10 in adjacent circumferential rows are preferably arranged in staggered relation so that the knives or cutters 13 in adjacent circumferential rows are in staggered relation after the manner represented in Fig. 4. The knives 13 are extended at an angle to the shanks 12 and each is provided with a substantially central cutting edge 14, which is curved from the toe to the heel of the knife and has beveled or inclined surfaces on opposite sides of the central edge which act to separate the sides of the cut in the ground and open up the same after the manner represented in Fig. 8, thereby obtaining cuts having substantially wide mouths for the reception of the grass seed deposited therein, the cuts being widest substantially at their center.

The knife carrying roller $a$ is carried by a framework, preferably made as herein shown and comprising substantially parallel side frames $d$, $e$, preferably made of flat bar iron or steel, and each of which is bent to form a substantially horizontal top member 15 and depending end members 16, 17, of unequal length as herein shown and bent at their free ends to form bearings 18, 19, for the shaft $c$ of the roller $a$ and for the shaft 20 of a smaller smooth roller 21.

The side frames $d$, $e$, are suitably tied together and in the present instance, the top members 15 are connected by a seed box 22 located between them and provided with flanges or arms 23, which are riveted or otherwise secured to the top members 15 of the side frames. The rear depending arms 17 are connected by a cross bar 24 and by the angle irons 25 to which the handle 26 is bolted or otherwise fastened, and the cross bar 24 is located close to the roller 21 to act as a scraper to remove the mud therefrom.

Provision is made for lifting the knife roller $a$ off of the ground sufficiently far to render its knives inoperative, and also to prevent the knives being dulled by small stones in the fair green, when the apparatus is moved from one putting green to another.

To this end a yoke $f$ comprising a top cross bar 30 and depending side bars 31 has its side bars pivotally mounted on the shaft $c$ of the knife roller $a$, and said side bars below the shaft $c$ have mounted on them wheels 32, which in the vertical position of the yoke shown in Fig. 1, lift the front end of the framework carrying the knife roller $a$ and support the front end of said framework.

The yoke $f$ carrying the wheels 32 may be rendered stationary in its elevated position in any suitable manner, and in the present instance a lug 34 on the top bar 30 is connected by a link 35 with a lever 36 pivoted at 37 to a bracket 38 on the handle 26, said lever being designed when turned into the position shown in Fig. 1, to remain in such position until positively moved by hand into the position shown in Fig. 2.

When the lever 36 is moved into the position shown in Fig. 2, the yoke $f$ is moved thereby into the inclined position shown in Fig. 2, and the wheels 32 are moved back of the vertical plane through the center of the knife roller $a$, which allows the latter to descend and rest on the ground, in which position some of the knives 13 penetrate the ground.

The knife roller $a$ is now in its operative position and by pushing the apparatus forward by means of the handle 26 or by pulling it forward by means of a rope, chain or the like, not shown, but which is engaged with a hook or eye 40 on a bail 41 fastened at its ends to the depending arms 16 of the framework, the knife roller is caused to revolve, and as it revolves the curved knives form cuts 42 in the ground, into which the grass seeds may be deposited by an operator following the ground-opening apparatus and sowing the seed by hand or as is preferred, the seed may be supplied from the seed box 22, which is preferably substantially V-shaped in cross section, and is provided in one of its sides with a plurality of outlet ports or openings 45, (see Figs. 3 and 5), which are arranged in alignment with the knives 13 and are normally closed by valves, herein shown as spring metal tongues or strips 46, which are fastened at one end to the box and have their other ends free to be moved away from the box to uncover the ports 45 and allow the grass seed contained in the box to pass out by gravity alone or assisted by an ejector within the seed box.

In the present instance one construction of ejector is shown which consists of a plurality of fingers 47 on a rotatable shaft 48 which is extended through inclined slots 49 in the ends of the seed box and supported in bearing blocks 50, which have attached to them rods 51 which extend through lugs 52 attached to the ends of the seed box, and are provided with nuts 53, which limit the downward movement of the shaft 48 in the slots 49 by the springs 54 which encircle the said rods.

The shaft 48 is lifted up in the slots 49 by a yoke 55 having bent lower ends 56 which engage the bearing blocks 50, and having its cross bar 57 connected by a link or arm 58 to the lever 36.

When the lever 36 is moved into the position shown in Fig. 2, the shaft 48 is lowered so that the fingers 47 are in position to open the valves 46, and when the apparatus is in motion the knives 13 open up the ground and the seed flows out of the box assisted by the fingers 47, as the shaft 48 is revolved, which is effected by a belt 60 connecting a pulley 61 on the shaft 48 with a pulley 62 on the shaft $c$ of the knife roller $a$.

When the lever 36 is moved into the position shown in Fig. 1, the lower ends 56 of the yoke move the bearing blocks upwardly on an incline and thereby move the shaft 48 up in the slots 49, and thus remove the fingers 47 on the shaft 48 into a position wherein they can revolve with the said shaft without opening the valves 46, whereby waste of seed is avoided when the apparatus is being moved from one putting green to another.

In the present instance, the shaft 48 is provided with four valve operating fingers 47 radially arranged and spaced on the quarter, so that the valve is opened four times for each revolution of the shaft 48, and the rotation of the shaft 48 is timed with relation to the rotation of the knife roller $a$, so that a valve 46 is opened by each finger at or about the time the port or opening 45 in the feed box is above an opened up cut 42 in the ground, so that the seed may be deposited into said opened up cut.

While it is preferred to provide the apparatus with seed box, it is not desired to limit the invention in this respect.

By providing the knives with threaded shanks 12, which enter threaded sockets 10 in the roller $a$, said knives may be readily removed by unscrewing them from said sockets, for purpose of sharpening the knives or for replacing worn or damaged knives with new ones.

One construction of the invention is herein shown, but it is not desired to limit the invention to the particular construction shown.

In the drawings, only a sufficient number of the cutters or knives are shown affixed to the roller $a$ to enable the invention to be fully understood, but it will be understood that in the practical machine, the knives are distributed about the entire circumference of the roller.

Claims:

1. Apparatus for seeding golf putting greens comprising a supporting frame, a pair of green engaging elongated rollers supporting the frame, the forward roller comprising a knife roller having provision for making small individual cuts in the green separated from each other and of a character such as to preserve the smoothness of the playing surface of the green and the rear roller comprising a presser roller, a seed dispensing device mounted upon the frame having provision for directing substantially all of the dispensed seed into the relatively small cuts made by the knife roller, the weight of the apparatus being sufficient to cause the knives to penetrate the green, and the supporting rollers being of such width as to support the weight thereof so as to permit the apparatus to be moved across the green without sinking into the surface thereof.

2. Apparatus for seeding golf putting greens, comprising a supporting frame, a pair of green engaging elongated rollers supporting the frame, the forward roller comprising a knife roller having provision for making small individual cuts in the green separated from each other and of a character such as to preserve the smoothness of the playing surface of the green and the rear roller comprising a presser roller, a seed dispensing device mounted upon a frame having provision for directing substantially all of the dispensed seed into the relatively small cuts made by the knife roller, the weight of the apparatus being sufficient to cause the knives to penetrate the green, and the supporting rollers being of such width as to permit the apparatus to be moved across the green without sinking into the surface thereof, and means for elevating the forward end of the frame and the knife roller, and for supporting the same with the knife roller in raised position for the purpose specified.

3. Apparatus for seeding golf putting greens, comprising a supporting frame, a pair of green engaging elongated rollers supporting the frame, the forward roller comprising a knife roller having provision for making small individual cuts in the green of a character such as to preserve the smoothness of the playing surface of the green and the rear roller comprising a presser roller, a seed dispensing device mounted upon a frame having provision for directing substantially all of the dispensed seed into the relatively small cuts made by the knife roller, the weight of the apparatus being sufficient to cause the knives to penetrate the green, and the supporting rollers being of such width as to permit the apparatus to be moved across the green without sinking into the surface thereof, and means for elevating the forward end of the frame and the knife roller, and for supporting the same with the knife roller in raised position, said means comprising a yoke having side arms pivotally mounted on the shaft of said knife roller, and provided with wheels, a device connected on said handle and means connecting said device with the yoke.

4. Apparatus for seeding golf putting greens, comprising a supporting frame, a pair of green engaging elongated rollers supporting the frame, the forward roller being provided with a plurality of relatively short knives spaced apart and arranged in circumferential rows to make a plurality of rows of cuts in the putting green, with the cuts in each row spaced apart and of a character such as to preserve the smoothness of the playing surface of the green, and the rear roller comprising a presser roller, a seed dispensing mechanism mounted upon the frame between said rollers provided with a plurality of seed outlets arranged in alignment with the circumferential rows of knives on the knife roll, and means for automatically opening and closing said seed outlets whereby substantially all of the dispensed seed is directed into the relatively small cuts made by the knife roller, the weight of the apparatus being sufficient to cause the knives to penetrate the green and the width of said rollers being sufficient to permit the apparatus to be moved across the green without sinking into the surface thereof, and means for elevating the forward end of the frame and the knife roller, and for supporting the same with the knife roller in raised position for the purpose specified.

5. Apparatus for seeding golf putting greens, comprising a supporting frame, a pair of green engaging elongated rollers supporting the frame, the forward roller comprising a knife roller and having provision for making small individual cuts in the green separated from each other and of a character such as to preserve the smoothness of the playing surface of the green, and the rear roller comprising a presser roller, a seed dispensing device mounted upon the frame operating in timed relation to the movements of the knife roller and having provision for positively ejecting seed and directing substantially all of the dispensed seed into the relatively small cuts made by the knife roller, the weight of the apparatus being sufficient to cause the knives to penetrate the green and the supporting rollers being of such width as to support the weight thereof so as to permit the apparatus to be moved across the green without sinking into the surface thereof.

6. Apparatus for seeding golf putting greens comprising a supporting frame, a pair of green engaging elongated rollers supporting the frame, the forward roller comprising a knife roller and having provision for making small individual cuts in the green separated from each other and of a character such as to preserve the smoothness of the playing surface of the green, a seed dispensing device mounted upon the frame and comprising a seed box carried by the frame between the seed rollers and provided with a plurality of seed outlets arranged in alignment with the knives upon the knife roller, and means for controlling the dispensing of seed through said seed outlets including automatically closing valves and rotatable means for opening the valves and for positively ejecting the seed through the seed outlets arranged to operate in timed relation to the movements of the knife roller, whereby substantially all of the dispensed seed is directed into the relatively small cuts made by the knife roller, the weight of the apparatus being sufficient to cause the knives to penetrate the green, and the supporting rollers being of such width as to support the weight thereof so as to permit the apparatus to be moved across the green without sinking into the surface thereof.

In testimony whereof, I have signed my name to this specification.

ROBERT G. McANDREW.